Dec. 20, 1966  H. J. McCARTHY  3,292,319
SEA GULL GUARD
Filed June 22, 1964  2 Sheets-Sheet 1
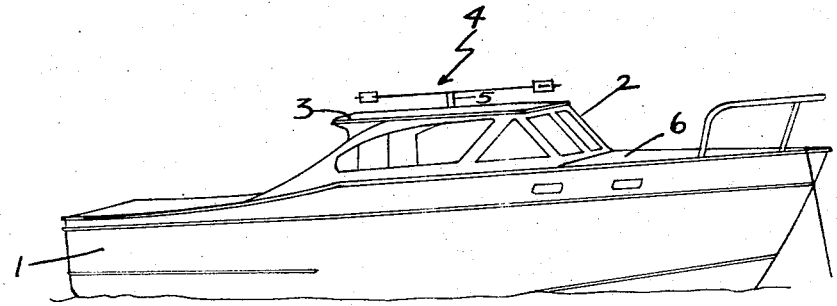
FIG. 1
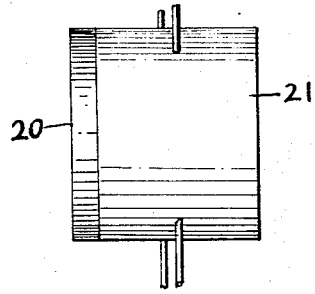
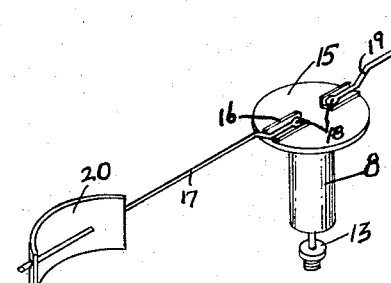
FIG. 3
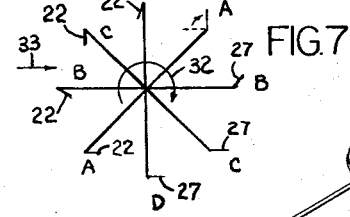
FIG. 7
FIG. 4
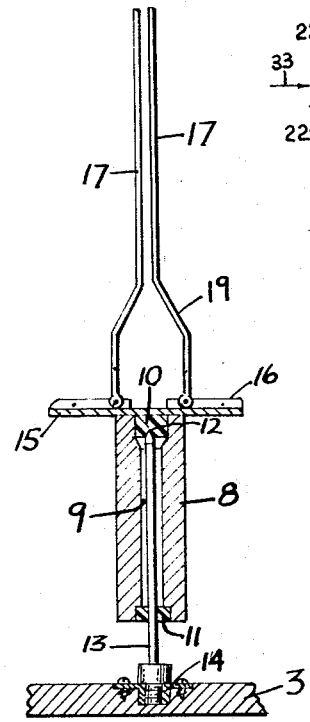
FIG. 2
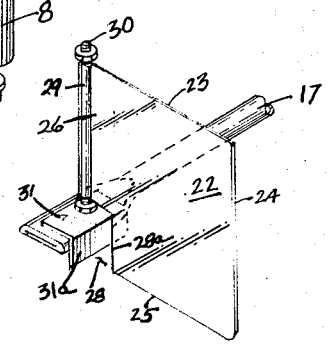
FIG. 6
FIG. 5
INVENTOR:
HENRY J. MC CARTHY
BY, Edgar O. Rost
ATTORNEY Dec. 20, 1966     H. J. McCARTHY     3,292,319
SEA GULL GUARD Filed June 22, 1964     2 Sheets-Sheet 2

INVENTOR.
HENRY J. MC CARTHY
BY, Edgar O. Root
ATTORNEY

United States Patent Office 3,292,319
Patented Dec. 20, 1966

1

3,292,319
SEA GULL GUARD
Henry J. McCarthy, Sargent Road, Marblehead, Mass.
Filed June 22, 1964, Ser. No. 376,705
2 Claims. (Cl. 52—101)

The present invention is related to a sea gull deterent means and more particularly to a self-propelled sea gull guard for use on marine craft.

Marine craft suffer considerable damage from the members of the gull family inhabiting the coastal regions adjacent large bodies of water. Numerous deterents have been devised to discourage sea gulls from alighting on any flat structures on marine craft. Included amongst such devices are small flags, nets, stuffed or paper mache owls, bells, other noise makers and the like. The underlying feature of such devices resides in a loud noise, obstruction or instilling of fear to repel the intruder. In all instances very little success in the attainment of the overall objective is achieved after the gulls become familiar with and learn to avoid the deterent.

The present invention provides a new and novel sea gull deterent means which is continuously moving and capable of hitting any sea gulls attempting to alight.

Another object of the invention is the provision of a sea gull deterent which is easily mounted.

A still further object of the present invention is the provision of a sea gull deterent device which is readily stored when not in operation.

Members of the gull family will land on the highest flat surface of a boat, which is generally the cabin canopy. Employment of the present embodiment of the invention will provide a continuously moving object having a sufficient spread of approximately 6 to 8 feet to sweep the complete canopy to thereby strike any sea gulls making a landing. A feature of the invention resides in the provision of wind actuated members disposed at the ends of elongated arms adapted to be freely rotatable at all times when the device is operative. The amount of wind power necessary to operate the device is exceedingly low and hence the device will be equally as effective after dusk when winds are at an extremely low velocity. An additional feature of the invention is the ease with which the overall device may be mounted when in use, as well as the simplified construction facilitating convenient storage.

Other objects, features and advantages of the present invention will become apparent after consideration of the following detailed specification and accompanying drawings, in which:

FIG. 1 is a perspective view of an illustrative embodiment in use;

FIG. 2 is a vertical cross-sectional view of the device in FIG. 1 in the folded position before removal and storage;

FIG. 3 is a perspective view of an illustrative embodiment employing concavo-convex shaped actuating members;

FIG. 4 is a perspective view of an illustrative embodiment having flat vane-type actuating members;

FIGS. 5 and 6 are side and top views; respectively, of one of the actuators shown in FIG. 4;

FIG. 7 is a diagrammatic representation of the movement of the embodiment shown in FIGS. 4, 5 and 6 when activated by wind power;

Figure 9:
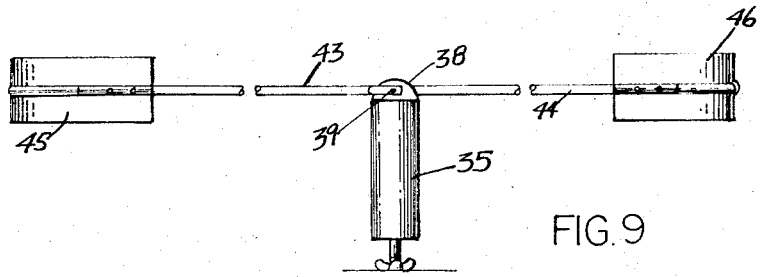
FIGS. 9 and 10 are side and top views of an alternative embodiment employing paddle-type wind actuators.

In FIG. 1, a pleasure craft 1 having a cabin superstructure 2 with a canopy is shown moored at its anchorage. The illustrative embodiment of the invention is desirable mounted as shown on the canopy 3 and is indicated generally by the numeral 4. It may be noted at this point in the description that the outer limits of the movable elements of the embodiment extend a sufficient distance from the central mounting member 5 to provide a circular path approximately equal to the dimensions of the canopy 3. It may further be noted that the sea gulls while preferring the higher superstructure may upon being repelled select a lower elevation such as the deck 6. The mounting of an additional illustrative embodiment on the deck 6 would, therefore be preferred by some users.

FIGS. 2 and 3 illustrate an embodiment comprising a central hub bearing member 8 defining an axial passageway 9 enclosed at opposing ends thereof by bearings 10 and 11. Bearing 10 provides an indentation 12 on its inner surface while bearing 11 is provided with a central aperture for receiving the mounting rod member 13. In this embodiment mounting member 13 is illustratively threaded into a recessed socket 14 disposed in turn in the canopy 3 of the craft 1. A transversely disposed substantially flat circuit plate 15 is permanently secured to the end of the hub member 8 adjacent bearing 10. A plurality of fastening members 16 are radially disposed on the upper surface of plate 15. While only two such fastening members have been shown three or four may be employed. Pivotally secured to members 16 are elongated arms 17 with the pivot pin indicated by the numeral 18. Each arm 17 is provided with a step portion 19 to facilitate storage as will be evident in FIG. 2. Concavo-convex members 20 and 21 are disposed adjacent to the ends of arms 17. Flat metallic plates may be formed to the desired shape by means of providing opposing apertures through which the arm member may be disposed. The members 20 and 21 are faced in such a manner as to be actuated by wind from any direction in order that the overall embodiment will revolve clockwise in a horizontal plane. In FIG. 2, the embodiment is shown in the nonoperational position with the arms 17 in an upright vertical juxtaposition to provide for easy removal from the mounting member 13. The illustrative embodiment shown in these views will be stored in a minimum of space and this method of storage will apply to all subsequent alternative embodiments of the invention.

In FIGS. 4, 5 and 6 another embodiment of the invention is illustrated employing movable vane-type members to replace the fixed members 20 and 21 shown in the previous views. For the purpose of this description a similar hub bearing member together with fastening members 16 has been shown and only the alternative features will now be described. Movable vane members 22 and 27 are disposed at the ends of each of the arms 17 to thereby present a flat surface to any wind forces. Referring to FIG. 5 each vane member comprises straightedged end walls indicated by numerals 23, 24, 25 and 26. A substantially right angular notch 28 is disposed along the bottom end wall 25 to thereby provide for the disposition of the end wall 25 below the plane of the arm 17. A hollow tubular member 29 is disposed along vertical end wall 26 to provide means for mounting the vane members by means of pin 30 secured adjacent to the end of the arms 17. In the area adjacent to the notch 28 and the end of the arm 17 a right-angular stop plate member 31 is positioned with wall surface 31a contacting notch wall 28a at the outer limits of the movement of the vane member. As shown in FIG. 6 the wind actuated vane member is movable in an oscillating manner through an arc of approximately 90 degrees from a position shown by the solid line to a position shown by the dotted line.

FIG. 7 indicates the position of vane members 22 and 27 throughout the circular path. Since each vane provides drive power through approximately 270 degrees rotation this arc has been indicated by the numeral 32. Commencing in position A—A with the wind direction indicated by arrow 33 vane 27 will have been displaced from the position indicated by the dotted line to the solid line position. This vane now exerts the driving force while vane 22 becomes the follower as it heads into the wind. In position B—B the embodiment is faced directly into the wind, however vane 27 due to its displacement continues the clockwise rotational movement. Position C—C illustrates vane 27 now directly facing into the wind so as to lose its effectiveness. Vane 22, however has now enough angular displacement to result in position D—D being attained. In this position which may be referred to as the commencement of the change position vane 22 would start its oscillatory movement and assume the role of the driving vane as indicated in position A—A to begin a new cycle. The vane member furthermost away from the wind forces becomes the driving vane with a change in relationship occurring after every 270 degrees of rotation in a horizontal plane.

Figure 8:
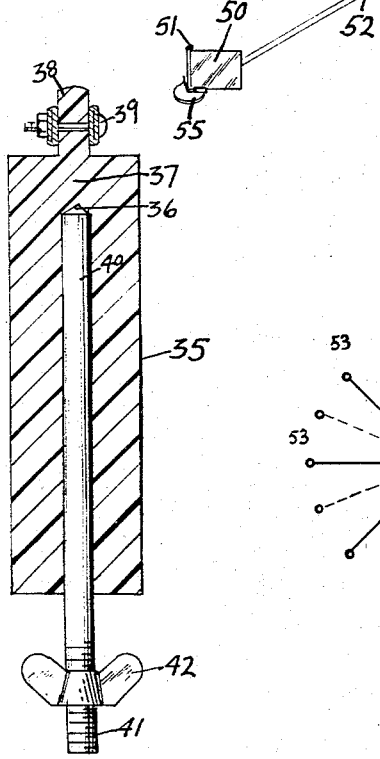
FIG. 8 is a vertical cross-sectional view of an alternative hub bearing member of the invention.

In FIG. 8 an alternative embodiment of a hub bearing member is illustrated and indicated by the numeral 35. The bearing member is provided with a reentrant axial passageway 36 and is completely closed at one end as at 37. The closed end is provided with a central standard portion 38 formed as an integral part of the structure. Arms may be pivotally suspended from the standard 38 by means of a common pin arrangement 39, for example a screw and nut with accompanying washers. The overall bearing member may be fabricated from nylon or Teflon to provide an extremely long wearing component which is also self-lubricating. The mounting member 40 comprises a metallic rod threaded at one end as at 41 with the threads mating with a standard socket arrangement (not shown). Wing nut 42 is intermediately disposed to fasten the rod member 40 in its desired position.

Figure 10:
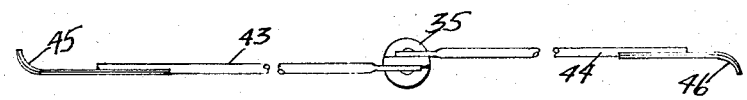

Referring next to FIGS. 9 and 10, the alternative embodiment of the invention is shown utilizing the aforedescribed hub bearing member 35 with oppositely disposed arms 43 and 44 secured to standard member 38 by means of a common pivot member 39. Wind actuating members 45 and 46 are secured adjacent the ends of the respective arms 43 and 44. In this embodiment a curved or paddle-shaped configuration with the faces of the respective members disposed in opposite directions will effectively provide for rotation of the overall embodiment.

Figure 11:
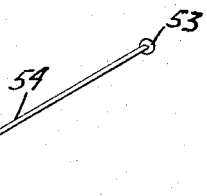
FIGS. 11 and 12 are views of another alternative embodiment of the invention.
Figure 12:
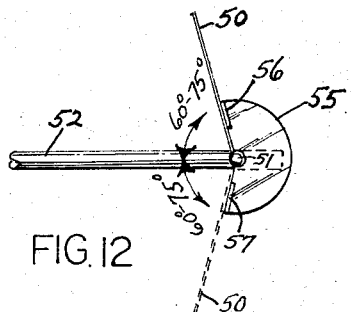
Figure 13:
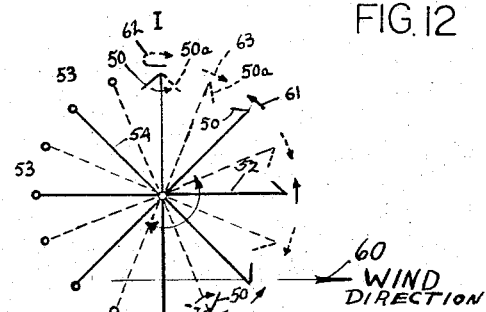
FIG. 13 is a diagrammatic representation of the movable vane portion of the embodiment shown in FIGS. 11 and 12 when activated by wind power.

In FIGS. 11 and 12 still another embodiment is illustrated with a single vane member 50 mounted on a pin 51 disposed at the end of arm 52 as a single wind controlled actuating means. A ball member 53 is provided at the opposite end on arm 54 as a safety device to prevent the arm from injuring someone in the eye. Stop plate 55 with tabs 56 and 57 acts as a limiter to the travel of vane member 50 through an arc of approximately 60°–75° on either side of the longitudinal axis of arm 52. With the unitary control means 50 capable of assuming any position within the range provided, the gull deterent means will oscillate in one direction for approximately 180 degrees and then reverse direction again over this distance. With the wind direction indicated by arrow 60 the path of travel of the embodiment through the 180 degree arc will now be described reference being directed to FIG. 13. The solid line for the vane member and remaining components indicates the embodiment heading in the counterclockwise direction indicated by the solid arrows 61. In the position I—I the vane member swings to a new tack designated by the arrow 62 and the dotted lines represent the clockwise movement with the vane member 50a and arrows 63 indicating this heading. Hence movement in either direction will cause arm 54 to swing in the same arc and the combined movement will strike any sea gulls attempting to land on an adjacent flat surface.

In the practice of the foregoing illustrative embodiments metal, wood as well as plastic materials have been effectively utilized bearing in mind considerations inherent in the atmospheric conditions in which the device is used. Numerous alternative embodiments have also been illustrated and described. It is my intention that any combinations of the foregoing may be utilized interchangeably in keeping with the spirit and scope of the invention as defined in the appended claims.

What I claim is:

1. A sea gull deterent means comprising a self-propelled device having a rotatable hub bearing member defining a central axial passageway open at one end and adapted to be freely suspended by means of a shaft positioned within said passageway, a plurality of elongated arm members pivotally mounted and radially disposed on said hub bearing member, said arm members extending transversely from said hub bearing member and having adjacent the ends of said arm members concavo-convex shaped members with the concave surfaces facing in opposite directions to effect movement of the deterent means in a horizontal plane.

2. A sea gull deterent comprising a wind-propelled device having a rotatable hub bearing member defining a central axial passageway open at one end and adapted to be freely suspended by means of a shaft positioned within said passageway, a pair of elongated arm members pivotally mounted and diametrically disposed on said hub bearing member, a single flat vane member pivotally disposed adjacent the end of one arm member and movement limiting means appended from opposing sides of said arm member to limit the free oscillatory movement of said vane member to an arcuate path of approximately 120 to 150 degrees taken in a direction perpendicular to the longitudinal axis of the arm member.

References Cited by the Examiner

UNITED STATES PATENTS

| | | | |
|---|---|---|---|
| 704,002 | 7/1902 | Cribbs | 40—39 |
| 923,185 | 6/1909 | Jurgensen | 73—189 |
| 1,209,459 | 12/1916 | Light | 46—53 |
| 1,286,380 | 12/1918 | Matthews | 40—37 |
| 1,329,044 | 1/1920 | Farnam | 46—53 |
| 1,511,965 | 10/1924 | Hennigh | 40—39 |
| 2,030,769 | 2/1936 | Slattengren | 40—39 |
| 2,532,572 | 12/1950 | Reeves | 46—53 X |
| 2,596,678 | 5/1952 | Gross | 46—53 X |

FRANK L. ABBOTT, *Primary Examiner.*

JOHN E. MURTAGH, *Examiner.*